US012609345B2

(12) United States Patent
Kim et al.

(10) Patent No.: US 12,609,345 B2
(45) Date of Patent: Apr. 21, 2026

(54) LITHIUM SECONDARY BATTERY

(71) Applicant: LG Energy Solution, Ltd., Seoul (KR)

(72) Inventors: Shulkee Kim, Daejeon (KR); Duyeol Kim, Daejeon (KR); Kimin Park, Daejeon (KR); Kwang Ho Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/172,750

(22) Filed: Apr. 8, 2025

(65) Prior Publication Data

US 2025/0260044 A1    Aug. 14, 2025

Related U.S. Application Data

(63) Continuation of application No. 18/777,938, filed on Jul. 19, 2024.

(30) Foreign Application Priority Data

Jul. 28, 2023    (KR) ........................ 10-2023-0098788

(51) Int. Cl.
| | |
|---|---|
| *H01M 10/052* | (2010.01) |
| *H01M 4/02* | (2006.01) |
| *H01M 4/36* | (2006.01) |
| *H01M 4/38* | (2006.01) |
| *H01M 4/485* | (2010.01) |
| *H01M 4/505* | (2010.01) |
| *H01M 4/525* | (2010.01) |
| *H01M 4/583* | (2010.01) |

(52) U.S. Cl.
CPC ......... *H01M 10/052* (2013.01); *H01M 4/364* (2013.01); *H01M 4/386* (2013.01); *H01M 4/485* (2013.01); *H01M 4/505* (2013.01); *H01M 4/525* (2013.01); *H01M 4/583* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 8,741,482 B2 | 6/2014 | Park et al. | |
| 8,753,533 B2 | 6/2014 | Park et al. | |
| 10,147,935 B2 | 12/2018 | Kim et al. | |
| 10,439,221 B2 | 10/2019 | Choi et al. | |
| 10,476,081 B2 | 11/2019 | Seol et al. | |
| 2014/0349180 A1* | 11/2014 | Kim ..................... | H01M 4/587 |
| | | | 429/211 |
| 2016/0197340 A1 | 7/2016 | Lee et al. | |
| 2017/0288207 A1 | 10/2017 | Kim et al. | |
| 2018/0219212 A1 | 8/2018 | Seol et al. | |
| 2018/0342757 A1* | 11/2018 | Choi ..................... | H01M 4/386 |
| 2020/0335783 A1* | 10/2020 | Lee ..................... | H01M 50/46 |
| 2023/0402597 A1 | 12/2023 | Kim et al. | |
| 2024/0079752 A1 | 3/2024 | Lee | |

FOREIGN PATENT DOCUMENTS

| | | |
|---|---|---|
| CN | 113921903 A | 1/2022 |
| CN | 115832277 A | 3/2023 |
| EP | 4089764 A1 | 11/2022 |
| JP | 2021501982 A | 1/2021 |
| KR | 101297910 B1 | 8/2013 |
| KR | 101369951 B1 | 3/2014 |
| KR | 10-2016-0001651 A | 1/2016 |
| KR | 10-2017-0069153 A | 6/2017 |
| KR | 101786909 B1 | 10/2017 |
| KR | 101796344 B1 | 11/2017 |
| KR | 101937897 B1 | 1/2019 |
| KR | 102088491 B1 | 3/2020 |
| KR | 20200044448 A | 4/2020 |
| KR | 20220092435 A | 7/2022 |
| KR | 20230076463 A | 5/2023 |
| WO | 2018026153 A1 | 2/2018 |

OTHER PUBLICATIONS

Extended European Search Report including Written Opinion for Application No. 24849436.1 dated Dec. 23, 2025. 8 pages.

* cited by examiner

*Primary Examiner* — Zhongqing Wei
(74) *Attorney, Agent, or Firm* — Lerner David LLP

(57) ABSTRACT

A lithium secondary battery includes a positive electrode, a separator, and a negative electrode, wherein the negative electrode includes a silicon-based active material and wherein a resistance ratio represented by Equation 1 is 100% to 140%.

18 Claims, No Drawings

LITHIUM SECONDARY BATTERY

CROSS-REFERENCE TO RELATED APPLICATIONS

This application is a continuation of U.S. patent application Ser. No. 18/777,938 filed on Jul. 19, 2024, which claims priority to and the benefit of Korean Patent Application No. 10-2023-0098788 filed in the Korean Intellectual Property Office on Jul. 28, 2023, the entire content of which is incorporated herein by reference in its entirety for all purposes as if fully set forth herein.

TECHNICAL FIELD

The present disclosure relates to a lithium secondary battery.

BACKGROUND

A secondary battery is universally applied not only to a portable device, but also to an electric vehicle (EV) or a hybrid electric vehicle (HEV) that is driven by an electrical driving source.

The secondary battery is attracting attention as a new energy source to improve eco-friendliness and energy efficiency because of the primary advantage that the use of fossil fuels can be dramatically reduced and the secondary advantage that no by-products are generated from the use of energy.

In general, a secondary battery includes a positive electrode, a negative electrode, a separator interposed between the positive electrode and the negative electrode, an electrolyte, and the like. In addition, the electrode such as a positive electrode and a negative electrode may have an electrode active material layer provided on a current collector.

As utilization of the secondary battery increases, various battery performances are required. Therefore, attempts are being made to develop types of materials or combinations of materials that can improve battery performance.

SUMMARY

The present disclosure has been made in an effort to provide a lithium secondary battery with improved life.

An example of the present disclosure provides a lithium secondary battery including a positive electrode, a separator, and a negative electrode, wherein the negative electrode includes a silicon-based active material, and a resistance ratio represented by Equation 1 below is within a range of 100% to 140%:

$$[SOC \text{ 5\% discharge resistance}] / \quad \text{[Equation 1]}$$
$$[SOC \text{ 50\% discharge resistance}] \times 100 - 100$$

The SOC 5% discharge resistance and the SOC 50% discharge resistance are resistances measured when a discharge pulse is applied at states of charge (SOC) of 5% and 50%, 2.5 C and 25° C. for 10 seconds, respectively.

According to an example of the present disclosure, the lithium secondary resistance ratio represented by Equation 2 below within a range of 90% to 110%:

$$[SOC \text{ 5\% discharge resistance}] / \quad \text{[Equation 2]}$$
$$[SOC \text{ 20\% discharge resistance}] \times 100 - 100$$

The SOC 5% discharge resistance and the SOC 20% discharge resistance are resistances measured when a discharge pulse is applied at states of charge (SOC) of 5% and 20%, 2.5 C and 25° C. for 10 seconds, respectively.

According to an example of the present disclosure, the positive electrode includes a positive electrode active material whose $D_{50}$ is 9 μm or greater and a positive electrode active material whose $D_{50}$ is 6 μm or less.

According to an example of the present disclosure, a silicon-based active material and a carbon-based active material are included as a negative electrode active material.

According to examples of the present disclosure, it is possible to implement a high-capacity cell by using a silicon-based active material as a negative electrode active material, and to improve life performance of the battery by controlling the depth of use of the silicon-based active material by satisfying the resistance ratio according to the specific state of charge (SOC).

DETAILED DESCRIPTION

Hereinafter, the present disclosure will be described in more detail for better understanding of the present disclosure. The present disclosure may be implemented in various different forms, and is not limited to the examples described herein. The terms or words used throughout the disclosure and the claims should not be construed as being limited to their ordinary or dictionary meanings, but construed as having meanings and concepts consistent with the technical idea of the present disclosure, based on the principle that an inventor may properly define the concepts of the words or terms to best explain the technology.

It will be further understood that the terms "comprises", "includes" or "have" when used in the present disclosure specify the presence of stated features, integers, steps, constitutional elements and/or combinations thereof, but do not preclude the presence or addition of one or more other features, integers, steps, constitutional elements, and/or combinations thereof.

Further, it will be understood that when an element such as a layer is referred to as being "on" another element, it can be "directly on" the other element or an intervening element may also be present. In contrast, when an element is referred to as being "directly on" another element, there are no intervening elements present. Further, when an element is referred to as being "on" a reference portion, the element is positioned above or below the reference portion, and it does not necessarily mean that the element is positioned "above" or "on" in a direction opposite to gravity.

A lithium secondary battery according to an example of the present disclosure includes a positive electrode, a separator, and a negative electrode, wherein the negative electrode includes a silicon-based active material, and a resistance ratio represented by Equation 1 below is within a range of 100% to 140%:

$$[SOC\ 5\%\ discharge\ resistance]/ \quad \text{[Equation 1]}$$

$$[SOC\ 50\%\ discharge\ resistance] \times 100-100$$

The SOC 5% discharge resistance and the SOC 50% discharge resistance are resistances measured when a discharge pulse is applied at states of charge (SOC) of 5% and 50%, 2.5 C and 25° C. for 10 seconds, respectively.

The resistance ratio represented by Equation 1 may be 100% to 140%, 105% to 130%, 110% to 120%, or 110% to 115%.

The present inventors found that an NCM-based positive electrode material, especially, an NCM-based positive electrode material to which a Co hydroxide coating layer is added for surface protection and improvement in low-resistance performance has low-resistance characteristics at the end of discharge. However, when an NCM-based positive electrode material is used together with a silicon-based negative electrode material, the kinetic burden increases of the negative electrode and the depth of use of the silicon-based active material is increased, leading to a decrease in life of the battery. In the present disclosure, the life performance of the battery can be improved by satisfying a ratio of discharge resistances according to a specific state of charge. Specifically, the present technology revealed that the depth of use of the silicon-based active material of the negative electrode can be controlled by increasing a discharge resistance at a low state of charge relative to a discharge resistance at a state of charge of 50%, thereby improving the life performance and/or rapid charging performance of the battery.

According to an example, the resistance ratio of Equation 1 may be within a range of 100% to 120% or 100% to 115%.

According to an example, the lithium secondary battery may have a resistance ratio represented by Equation 2 below within a range of 90% to 110%:

$$[SOC\ 5\%\ discharge\ resistance]/ \quad \text{[Equation 2]}$$

$$[SOC\ 20\%\ discharge\ resistance] \times 100-100$$

The SOC 5% discharge resistance and the SOC 20% discharge resistance are resistances measured when a discharge pulse is applied at states of charge (SOC) of 5% and 20%, 2.5 C and 25° C. for 10 seconds, respectively.

The resistance ratio represented by Equation 2 may be 90% to 110%, 90% to 100%, 90% to 98%, or 92% to 96%.

In the above example, the discharge resistance at a state of charge of 20% is relatively not high, as compared with the discharge resistance at a state of charge of 5%, and as a result, the depth of use of the silicon-based active material can be limited by controlling only the discharge resistance at the state of charge of 5%.

In an example, the silicon-based active material includes at least one selected from a group of a silicon oxide, a silicon metal complex, or a silicon carbon composite. Specifically, the silicon-based active material includes at least one selected from a group of SiOx ($0 \le x < 2$), SiMy (M is a metal, $1 \le y \le 4$), or Si/C. The silicon-based active material may include only one type, or two or more types together. When both the two negative electrode active material layers include silicon-based active materials, the same type of silicon-based active material, or different types or different combinations of silicon-based active materials may be used for the two active material layers.

When the negative electrode active material layer includes a silicon-based active material, the negative electrode active material layer may include 1 part by weight to 10 parts by weight of the silicon-based active material based on 100 parts by weight of the total negative electrode active material.

In an example of the present disclosure, the negative electrode active material layer including the silicon-based active material may further include a carbon-based active material. In this case, the carbon-based active material may include artificial graphite or natural graphite. The carbon-based active material may be included in an amount of 90 parts by weight or more and 99 parts by weight or less based on 100 parts by weight of the total negative electrode active material included in the negative electrode active material layer.

The active material including SiOx ($0 \le x < 2$) as the silicon-based active material may be a silicon-based composite particle including $SiO_x$ ($0 < x < 2$) and a pore.

The SiOx ($0 < x < 2$) corresponds to a matrix in the silicon-based composite particle. The $SiO_x$ ($0 < x < 2$) may be a form of including Si and $SiO_2$, and the Si may form a phase. That is, x corresponds to a ratio of the number of 0 to Si included in the $SiO_x$ ($0 < x < 2$). When the silicon-based composite particle includes the $SiO_x$ ($0 < x < 2$), a discharge capacity of a secondary battery can be improved.

The silicon-based composite particle may further include at least one of an Mg compound or a Li compound. The Mg compound and the Li compound may correspond to a matrix in the silicon-based composite particle.

The Mg compound and/or the Li compound may be present in the SiOx ($0 < x < 2$) and/or on a surface of the SiOx ($0 < x < 2$). The initial efficiency of the battery can be improved by the Mg compound and/or the Li compound.

The Mg compound may include at least one selected from a group including Mg silicate, Mg silicide, or Mg oxide. The Mg silicate may include at least one of $Mg_2SiO_4$ or $MgSiO_3$. The Mg silicide may include $Mg_2Si$. The Mg oxide may include MgO.

In an example of the present disclosure, the Mg element may be included in an amount of 0.1 wt % to 20 wt % or 0.1 wt % to 10 wt % based on 100 wt % of the total silicon-based active material. Specifically, the Mg element may be included in an amount of 0.5 wt % to 8 wt % or 0.8 wt % to 4 wt %. When the above range is satisfied, the Mg compound can be included in an appropriate content in the silicon-based active material, so the volume change of the silicon-based active material during charging and discharging of the battery can be easily suppressed, and the discharge capacity and initial efficiency of the battery can be improved.

The Li compound may include at least one selected from the group including Li silicate, Li silicide, or Li oxide. The Li silicate may include at least one selected from a group of $Li_2SiO_3$, $Li_4SiO_4$ or $Li_2Si_2O_5$. The Li silicide may include $Li_7Si_2$. The Li oxide may include $Li_2O$.

In an example of the present disclosure, the Li compound may include a form of lithium silicate. The lithium silicate is represented by $Li_aSi_bO_c$ ($2 \le a \le 4$, $0 < b \le 2$, $2 \le c \le 5$) and may be divided into crystalline lithium silicate and amorphous lithium silicate. The crystalline lithium silicate may be present in the silicon-based composite particle in a form of at least one lithium silicate selected from the group including $Li_2SiO_3$, $Li_4SiO_4$ or $Li_2Si_2O_5$, and the amorphous lithium silicate may be a form of $Li_aSi_bO_c$ (2≤a≤4, 0<b≤2, 2≤c≤5). However, the present disclosure is not limited thereto.

In an example of the present disclosure, the Li element may be included in an amount of 0.1 wt % to 20 wt % or 0.1 wt % to 10 wt % based on 100 wt % of the total silicon-based active material. In other examples, the Li element may be included in an amount of 0.5 wt % to 8 wt %, and more in some other examples, the Li element may be included in an amount of 0.5 wt % to 4 wt %. When the above ranges are satisfied, the Li compound may be included in an appropriate content in the silicon-based active material, so the volume change of the negative electrode active material during charging and discharging of the battery can be easily suppressed, and the discharge capacity and initial efficiency of the battery can be improved.

The content of the Mg element and Li element can be confirmed through ICP analysis. For the ICP analysis, a predetermined amount (about 0.01 g) of a negative electrode active material is precisely aliquoted, transferred to a platinum crucible, and completely decomposed on a hot plate by adding nitric acid, hydrofluoric acid and sulfuric acid thereto. Then, by using an inductively coupled plasma atomic emission spectrometer (ICP-AES, Perkin-Elmer 7300), a reference calibration curve is obtained by measuring the intensity of a standard liquid, which has been prepared using a standard solution (5 mg/kg), at an intrinsic wavelength of the Mg element or Li element. Subsequently, a pre-treated sample solution and a blank sample are introduced into the spectrometer, and by measuring the intensity of each component to calculate an actual intensity, calculating the concentration of each component based on the obtained calibration curve, and then performing a conversion such that the sum of the calculated concentrations of the components is equal to a theoretical value, the Mg element or Li element content in the prepared silicon-based active material can be analyzed.

In an example of the present disclosure, a carbon layer may be provided on a surface of the silicon-based composite particle and/or inside the pore. Conductivity is imparted to the silicon-based composite particle by the carbon layer, so that the initial efficiency, life characteristics, and battery capacity characteristics of a secondary battery including the negative electrode active material including the silicon-based composite particle can be improved. A total amount of the carbon layer included may be 5 wt % to 40 wt % based on 100 wt % of the total silicon-based composite particle.

In an example of the present disclosure, the carbon layer may include at least one of amorphous carbon or crystalline carbon.

An average particle diameter ($D_{50}$) of the silicon-based composite particle may be 2 μm to 15 μm, specifically 3 μm to 12 μm, and more specifically 4 μm to 10 μm. When the above range is satisfied, a side reaction between the silicon-based composite particle and the electrolyte solution is controlled, and the discharge capacity and initial efficiency of the battery can be effectively implemented.

In the present disclosure, the average particle diameter ($D_{50}$) may be defined as a particle diameter corresponding to 50% of the cumulative volume in the particle diameter distribution curve of particles. The average particle diameter ($D_{50}$) may be measured using, for example, a laser diffraction method. In the laser diffraction method, in general, particle diameters ranging from a submicron range to several millimeters can be measured, and results with high reproducibility and high resolvability can be obtained.

The active material including Si/C as the silicon-based active material is a composite of Si and C, and is distinguished from silicon carbide denoted as SiC. The silicon carbon composite may be a composite of silicon, graphite, etc., and may form a structure in which a core composite of silicon, graphite, etc. is surrounded by graphene, amorphous carbon or the like. In the silicon carbon composite, silicon may be nano silicon. An average particle diameter ($D_{50}$) of the active material including the Si/C may be 2 μm to 15 μm, specifically 3 μm to 12 μm, and more specifically 4 μm to 10 μm. A carbon layer may be provided on a surface of the active material including Si/C.

In an example of the present disclosure, the negative electrode may include a current collector layer and a negative electrode active material layer, and the negative electrode active material in 100 parts by weight of the negative electrode active material layer may be included in an amount of 80 parts by weight or more and 99.9 parts by weight or less, 90 parts by weight or more and 99.9 parts by weight or less, 95 parts by weight or more and 99.9 parts by weight or less, or 98 parts by weight or more and 99.9 parts by weight or less.

In an example of the present disclosure, the positive electrode may include a positive electrode active material whose $D_{50}$ is 9 μm or greater.

In an example of the present disclosure, the positive electrode may include 30 parts by weight to 75 parts by weight, for example, 50 parts by weight to 60 parts by weight of the positive electrode active material whose $D_{50}$ is 9 μm or greater, based on 100 parts by weight of the positive electrode active material.

In an example of the present disclosure, the positive electrode may include a positive electrode active material whose $D_{50}$ is 6 μm or less.

In an example of the present disclosure, the positive electrode may include 20 parts by weight to 100 parts by weight of the positive electrode active material whose $D_{50}$ is 6 μm or less, based on 100 parts by weight of the positive electrode active material.

In an example of the present disclosure, the positive electrode may include a positive electrode active material whose $D_{50}$ is 9 μm or greater and a positive electrode active material whose $D_{50}$ is 6 μm or less.

In an example of the present disclosure, the positive electrode may include 80 parts by weight or less in excess of 0 part by weight of a positive electrode active material whose $D_{50}$ is 9 μm or greater and 20 parts by weight or more and less than 100 parts by weight of a positive electrode active material whose $D_{50}$ is 6 μm or less, based on 100 parts by weight of the positive electrode active material.

In an example of the present disclosure, the positive electrode may include 30 parts by weight or more and 75 parts by weight or less of a positive electrode active material whose $D_{50}$ is 9 μm or greater and 25 parts by weight or more and 70 parts by weight or less of a positive electrode active material whose $D_{50}$ is 6 μm or less, based on 100 parts by weight of the positive electrode active material.

In an example of the present disclosure, the positive electrode may include 40 parts by weight or more and 70 parts by weight or less of a positive electrode active material whose $D_{50}$ is 9 μm or greater and 30 parts by weight or more and 60 parts by weight or less of a positive electrode active material whose $D_{50}$ is 6 μm or less, based on 100 parts by weight of the positive electrode active material.

In an example of the present disclosure, the positive electrode may include a lithium composite transition metal compound including nickel (Ni) and cobalt (Co), as an active material. The lithium composite transition metal compound may further include at least one of manganese or aluminum. The lithium composite transition metal compound may include 60 mol % or more, 60 mol % or more and less than 100 mol %, 60 mol % to 80 mol %, 80 mol % or more, for example, 80 mol % or more and less than 100 mol % of nickel among metals other than lithium.

According to an additional example of the present disclosure, the negative electrode active material layer may further include a negative electrode binder, in addition to the negative electrode active material.

The negative electrode binder may serve to improve adhesion between particles of the negative electrode active material and adhesive force between particles of the negative electrode active material and the negative electrode current collector. For the negative electrode binder, those known in the art may be used. Non-limiting examples thereof may include at least one selected from the group including polyvinylidenefluoride-hexafluoropropylene copolymer (PVDF-co-HFP), polyvinylidenefluoride, poly-acrylonitrile, polymethylmethacrylate, polyvinyl alcohol, carboxymethylcellulose (CMC), starch, hydroxypropylcel-lulose, regenerated cellulose, polyvinylpyrrolidone, tet-rafluoroethylene, polyethylene, polypropylene, polyacrylic acid, ethylene-propylene-diene monomer (EPDM), sulfonated EPDM, styrene butadiene rubber (SBR), fluoro rubber, poly acrylic acid, or the above-mentioned materials in which a hydrogen is substituted with Li, Na, Ca, etc., and may also include various copolymers thereof.

The negative electrode binder may be included in an amount of 0.1 part by weight or more and 20 parts by weight or less, for example, 0.3 part by weight or more and 20 parts by weight or less, or 0.5 part by weight or more and 10 parts by weight or less based on 100 parts by weight of the negative electrode active material layer.

The negative electrode active material layer may not include a conductive material, but may further include a conductive material if necessary. The conductive material included in the negative electrode active material layer is not particularly limited as long as it has conductivity without causing a chemical change in the battery, and for example, graphite such as natural graphite or artificial graphite; car-bon black such as acetylene black, Ketjen black, channel black, furnace black, lamp black, and thermal black; a conductive fiber such as a carbon fiber and a metal fiber; a conductive tube such as a carbon nanotube; metal powders such as fluorocarbon, aluminum, and nickel powders; a conductive whisker such as zinc oxide and potassium titan-ate; a conductive metal oxide such as titanium oxide; a conductive material such as polyphenylene derivative, and the like may be used. A content of the conductive material in the negative electrode active material layer may be 0.01 part by weight to 20 parts by weight, or 0.03 part by weight to 18 parts by weight based on 100 parts by weight of the negative electrode active material layer.

In an example of the present disclosure, a thickness of the negative electrode active material layer may be 90 μm or greater and 150 μm or less.

In an example of the present disclosure, the negative electrode current collector is not particularly limited as long as it has conductivity without causing a chemical change in the battery. For example, for the current collector, copper, stainless steel, aluminum, nickel, titanium, fired carbon, aluminum or stainless steel each surface-treated with car-bon, nickel, titanium, silver, or the like, or the like may be used. Specifically, transition metals that adsorb carbon well, such as copper and nickel, may be used for the current collector. A thickness of the current collector may be 1 μm to 500 μm. However, the thickness of the current collector is not limited thereto.

In an example of the present disclosure, the positive electrode includes a positive electrode current collector and a positive electrode active material layer provided on the positive electrode current collector and including the posi-tive electrode active material. A thickness of the positive electrode active material layer may be 20 μm or greater and 500 μm or less.

The positive electrode current collector is not particularly limited as long as it has conductivity without causing a chemical change in the battery. For example, stainless steel, aluminum, nickel, titanium, fired carbon, aluminum or stain-less steel each surface-treated with carbon, nickel, titanium, silver, or the like, or the like may be used. In addition, the positive electrode current collector may typically have a thickness of 1 to 500 μm, and a surface of the current collector may be formed with microscopic irregularities to enhance adhesive force of the positive electrode active material. For example, the positive electrode current collec-tor may be used in various forms such as a film, a sheet, a foil, a net, a porous body, a foamed body, and a non-woven fabric body.

In an example, the positive electrode active material in 100 parts by weight of the positive electrode active material layer may be included in an amount of 80 parts by weight or more and 99.9 parts by weight or less, 90 parts by weight or more and 99.9 parts by weight or less, 95 parts by weight or more and 99.9 parts by weight or less, or 98 parts by weight or more and 99.9 parts by weight or less.

According to a further example of the present disclosure, the positive electrode active material layer according to the example described above may further include a positive electrode binder and a conductive material.

The positive electrode binder may serve to improve adhesion between particles of the positive electrode active material and adhesive force between particles of the positive electrode active material and the positive electrode current collector. For the positive electrode binder, those known in the art may be used. Non-limiting examples thereof may include polyvinylidene fluoride (PVDF), vinylidene fluo-ride-hexafluoropropylene copolymer (PVDF-co-HFP), polyvinyl alcohol, polyacrylonitrile, carboxymethylcellu-lose (CMC), starch, hydroxypropylcellulose, regenerated cellulose, polyvinylpyrrolidone, tetrafluoroethylene, poly-ethylene, polypropylene, ethylene-propylene-diene polymer (EPDM), sulfonated-EPDM, styrene butadiene rubber (SBR), fluoro rubber, various copolymers thereof, and the like, and any one thereof or a mixture of two or more thereof may be used.

The positive electrode binder may be included in an amount of 0.1 part by weight or more and 50 parts by weight or less, for example, 0.3 part by weight or more and 35 parts by weight or less, or 0.5 part by weight or more and 20 parts by weight or less based on 100 parts by weight of the positive electrode active material layer.

The conductive material included in the positive electrode active material layer is used to impart conductivity to the electrode, and can be used without particular limitation as long as the conductive material has electronic conductivity without causing a chemical change in a battery. Specific examples may include graphite such as natural graphite and artificial graphite; a carbon-based material such as carbon black, acetylene black, Ketjen black, channel black, furnace black, lamp black, thermal black, carbon fiber and carbon nanotube; metal powders or metal fibers such as copper, nickel, aluminum and silver; a conductive whisker such as zinc oxide and potassium titanate; a conductive metal oxide such as titanium oxide; or a conductive polymer such as polyphenylene derivative, or the like, and any one thereof or a mixture of two or more thereof may be used. Specifically, in an example, the conductive material may include one or more of a single-walled carbon nanotube (SWCNT); and a multi-walled carbon nanotube (MWCNT).

The conductive material may be included in an amount of 0.1 part by weight or more and 10 parts by weight or less, for example, 0.1 part by weight or more and 7 parts by weight or less, or 0.1 part by weight or more and 5 parts by weight or less based on 100 parts by weight of a composition for the positive electrode active material layer.

The positive electrode and the negative electrode can be manufactured according to a conventional method for manufacturing a positive electrode and a negative electrode, except using the positive and negative electrode active materials described above. Specifically, the electrode can be manufactured by applying a composition for active material layer formation, including the above-described active material and, optionally, a binder and a conductive material, onto a current collector, followed by drying and rolling. In this case, the types and contents of the positive and negative electrode active materials, the binder, and the conductive material are as described above. The solvent may be a solvent commonly used in the art, such as dimethyl sulfoxide (DMSO), isopropyl alcohol, N-methylpyrrolidone (NMP), acetone, or water, and any one thereof or a mixture of two or more thereof may be used. A used amount of the solvent is sufficient if it can dissolve or disperse the active material, the conductive material, and the binder in consideration of an applied thickness of a slurry and a manufacturing yield, and then, allows for a viscosity capable of exhibiting excellent thickness uniformity when applied to manufacture a positive electrode and a negative electrode. Alternatively, the positive electrode and the negative electrode may be manufactured by laminating, on a current collector, a film obtained by casting the composition for active material layer formation on a separate support and peeling off it from the support.

The separator serves to separate the negative electrode and the positive electrode and to provide a migration path of lithium ions, in which any separator may be used as the separator without particular limitation as long as it is typically used in a secondary battery, and particularly, a separator having high moisture-retention ability for an electrolyte solution as well as a low resistance against migration of electrolyte ions may be used. Specifically, a porous polymer film, for example, a porous polymer film manufactured from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. In addition, a usual porous non-woven fabric, for example, a non-woven fabric formed of high melting point glass fibers, polyethylene terephthalate fibers, or the like may be used. Furthermore, a coated separator including a ceramic component or a polymer material may be used to secure heat resistance or mechanical strength, and the separator having a single layer or multi-layer structure may be selectively used.

Examples of the electrolyte may include an organic-based liquid electrolyte, an inorganic-based liquid electrolyte, a solid polymer electrolyte, a gel-type polymer electrolyte, a solid inorganic electrolyte, or a molten-type inorganic electrolyte that may be used when manufacturing a lithium secondary battery, but are not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimetoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, propylene carbonate derivative, tetrahydrofuran derivative, ether, methyl propionate, or ethyl propionate may be used.

In particular, among the carbonate-based organic solvents, ethylene carbonate and propylene carbonate, which are cyclic carbonates, are high-viscosity organic solvents and can be used because they have high permittivity to dissociate a lithium salt well. When the cyclic carbonate is mixed with a linear carbonate with low viscosity and low permittivity, such as dimethyl carbonate and diethyl carbonate, in a suitable ratio and used, an electrolyte having high electric conductivity may be prepared, and therefore, may be used.

A lithium salt may be used as the metal salt, and the lithium salt is a material that is readily soluble in the non-aqueous electrolyte solution, in which, for example, one or more species selected from the group including $F—$, $Cl—$, $I—$, $NO_3—$, $N(CN)_2—$, $BF_4—$, $ClO_4—$, $PF_6—$, $(CF_3)_2PF_4—$, $(CF_3)_3PF_3—$, $(CF_3)_4PF_2—$, $(CF_3)_5PF—$, $(CF_3)_6P—$, $CF_3SO_3—$, $CF_3CF_2SO_3—$, $(CF_3SO_2)_2N—$, $(FSO_2)_2N—$, $CF_3CF_2(CF_3)_2CO—$, $(CF_3SO_2)_2CH—$, $(SF_5)_3C—$, $(CF_3SO_2)_3C—$, $CF_3(CF_2)_7SO_3—$, $CF_3CO_2—$, $CH_3CO_2—$, $SCN—$ or $(CF_3CF_2SO_2)_2N—$ may be used as an anion of the lithium salt.

One or more additives, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride, may be further included in the electrolyte for the purpose of improving life characteristics of the battery, suppressing a decrease in battery capacity, improving discharge capacity of the battery, and the like, in addition to the above-described electrolyte components.

A further example of the present disclosure provides a battery module including the secondary battery as a unit cell, and a battery pack including the battery module. Since the battery module and the battery pack include the secondary battery having high capacity, high-rate capability, and high cycle characteristics, the battery module and the battery pack may be used as a power source of a medium to large sized device selected from the group including an electric vehicle, a hybrid electric vehicle, a plug-in hybrid electric vehicle, or a power storage system.

Since the secondary battery according to the examples of the present disclosure stably exhibits excellent discharge capacity, output characteristics, and cycle performance, the secondary battery can be used as a power source of a portable device such as a mobile phone, a laptop computer, and a digital camera as well as a medium to large sized device selected from the group including an electric vehicle, a hybrid electric vehicle, a plug-in hybrid electric vehicle and a power storage system. For example, the battery module or battery pack may be used as a power source of a medium to large sized device of any one or more of a power tool; an electric vehicle including an electric vehicle (EV), a hybrid electric vehicle, or a plug-in hybrid electric vehicle (PHEV); or a power storage system.

Hereinafter, examples will be provided for better understanding of the present disclosure. It will be apparent to one skilled in the art that the examples are only provided disclosure and various to illustrate the present modifications and alterations are possible within the scope and technical spirit of the present technology. Such modifications and alterations naturally fall within the scope of claims included herein.

EXAMPLES

<Preparation of Cell>

Example 1

Preparation of Positive Electrode

A positive electrode slurry (a solid content of the positive electrode slurry was included in an amount of 70 parts by weight with respect to the total positive electrode slurry) was prepared by adding an aluminum (Al)-doped lithium composite transition metal compound including nickel (Ni), cobalt (Co) and manganese (Mn) at an atomic ratio of 84:8:8, as a positive electrode active material, a conductive material (CNT) and a binder (PVDF) to a methylpyrrolidone (NMP) solvent at a weight ratio of 97:1:2.

A positive electrode was prepared by applying the positive electrode slurry prepared above onto an Al current collector, followed by drying and then roll-pressing at room temperature.

The positive electrode active material included a positive electrode active material whose $D_{50}$ was 9.7 μm and a positive electrode active material whose $D_{50}$ was 4.3 μm at a weight ratio of 1:1.

Preparation of Negative Electrode

For a negative electrode active material layer, a negative electrode slurry (a solid content of the negative electrode slurry was included in an amount of 50 parts by weight with respect to the total negative electrode slurry) was prepared by adding a negative electrode active material including an Mg-doped SiO active material and a carbon-based active material (including artificial graphite and natural graphite at a weight ratio of 8:2) (the Mg-doped SiO active material was included in an amount of 5 parts by weight based on 100 parts by weight of the total negative electrode active material), a conductive material (carbon black), a binder (SBR) and a thickener (Li-CMC) to a distilled water solvent at a weight ratio of 96:1:2:1.

A negative electrode was prepared by applying the negative electrode active material layer slurry prepared above onto a Cu current collector, followed by drying and then roll-pressing at room temperature.

Preparation of Cell

A cell was prepared by interposing and assembling a separator between the positive electrode and the negative electrode prepared above, injecting an electrolyte solution, and then activating it.

Composition of electrolyte solution: 1M $LiPF_6$, ethylene carbonate (EC)/ethylmethyl carbonate (EMC) (volume ratio 3/7), vinylene carbonate (VC)/propane sultone (PS) (included in the electrolyte by 3 parts by weight and 1.5 parts by weight, respectively)

Activation: charging at 0.1 C for 3 hrs., then aging at high temperature/room temperature, and then degas

Example 2

Electrodes and a cell were prepared in the same manner as in Example 1, except that the positive electrode active material included a positive electrode active material whose $D_{50}$ was 9.7 μm and a positive electrode active material whose $D_{50}$ was 4.3 μm at a weight ratio of 6:4.

Comparative Example 1

Electrodes and a cell were prepared in the same manner as in Example 1, except that the positive electrode active material included only a positive electrode active material whose $D_{50}$ was 4.3 μm.

Comparative Example 2

Electrodes and a cell were prepared in the same manner as in Example 1, except that the positive electrode active material included a positive electrode active material whose $D_{50}$ was 9.7 μm and a positive electrode active material whose $D_{50}$ was 4.3 μm at a weight ratio of 25:75.

Comparative Example 3

Electrodes and a cell were prepared in the same manner as in Example 1, except that the positive electrode active material included a positive electrode active material whose $D_{50}$ was 9.7 μm and a positive electrode active material whose $D_{50}$ was 4.3 μm at a weight ratio of 8:2.

Comparative Example 4

Electrodes and a cell were prepared in the same manner as in Example 1, except that the negative electrode included only a carbon-based active material (including artificial graphite and natural graphite at a weight ratio of 8:2) as a negative electrode active material.

Comparative Example 5

Electrodes and a cell were prepared in the same manner as in Example 1, except that the negative electrode included only a carbon-based active material (including artificial graphite and natural graphite at a weight ratio of 8:2) as a negative electrode active material and the positive electrode active material included only a positive electrode active material whose $D_{50}$ was 4.3 μm or less.

Experimental Example 1. Room Temperature (25° C.) Resistance Performance at SOC of 50%

The resistance was measured by applying a discharge pulse at a state of charge (SOC) of 50%, 2.5 C and 25° C. for 10 seconds.

Experimental Example 2. Room Temperature (25° C.) Resistance Performance at SOC of 20%

The resistance was measured by applying a discharge pulse at a state of charge (SOC) of 20%, 2.5 C and 25° C. for 10 seconds.

Experimental Example 3. Room Temperature (25° C.) Resistance Performance at SOC of 5%

The resistance was measured by applying a discharge pulse at a state of charge (SOC) of 5%, 2.5 C and 25° C. for 10 seconds.

Experimental Example 4. Room Temperature (25° C.) Cycle Performance

The prepared cells were subjected to cycle of constant current/constant voltage (CC/CV) charging (0.05 C-cut) to 4.2 V at 0.33 C and constant current (CC) discharging at 0.33 C (2.5 V-cut) at room temperature (25° C.). After 300 cycles, the discharge capacity was measured. Then, after charging as described above, an SOC of 50% was set with 0.33 C discharging, and the capacity retention rate (capacity after 300 cycles/initial capacity×100%) was measured by discharging the cell with a pulse at 2.5 C for 10 seconds to measure a resistance.

The measured values of the batteries prepared in Examples and Comparative Examples are listed in Table 1 below.

TABLE 1

| | Experimental Example 1 Initial SOC 50 resistance (mΩ) | Experimental Example 2 Initial SOC 20 resistance (mΩ) | Experimental Example 3 Initial SOC 5 resistance (mΩ) | Equation 1 SOC5/ SOC50 × 100-100 (%) | Equation 2 SOC5/ SOC20 × 100-100 (%) | Experimental Example 4 25° C. Cycle capacity retention rate (%) |
|---|---|---|---|---|---|---|
| Example 1 | 1.36 | 1.50 | 2.88 | 111.8 | 92.0 | 95.1 |
| Example 2 | 1.36 | 1.49 | 2.92 | 114.7 | 96.0 | 94.7 |
| Comparative Example 1 | 1.28 | 1.41 | 2.53 | 97.7 | 79.4 | 71.8 |
| Comparative Example 2 | 1.31 | 1.50 | 2.60 | 98.5 | 73.3 | 65.4 |
| Comparative Example 3 | 1.35 | 1.54 | 3.29 | 143.7 | 113.6 | 97.0 |
| Comparative Example 4 | 1.58 | 1.66 | 3.31 | 108.8 | 99.0 | 94.1 |
| Comparative Example 5 | 1.52 | 1.60 | 2.80 | 84.4 | 74.5 | 93.3 |

It can be seen from the results of Examples 1 and 2 in Table 1 that, when the resistance ratio represented by Equation 1 satisfies the range of 100% to 140%, and the resistance ratio represented by Equation 2 satisfies the range of 90% to 110%, the capacity retention rate exhibits the high value of around 95% after the room temperature (25° C.) cycle.

On the other hand, as in Comparative Examples 1 and 2, it can be seen that, when the resistance ratios are lower than those represented by Equations 1 and 2, the capacity retention rate exhibits the low value of around 70% after the room temperature (25° C.) cycle.

As in Comparative Example 3, when the resistance ratios represented by Equation 1 and Equation 2 are excessively increased, the capacity retention rate exhibits the high value of 97% after the room temperature (25° C.) cycle, which ensures life performance, but the resistance at SOC of 20% also increases, which may adversely affect battery output performance.

Comparative Examples 4 and 5 correspond to cases where the negative electrode was made only of the carbon-based active material. It can be seen that, when the negative electrode does not include a silicon-based active material but includes only a carbon-based active material, the ratio of the positive electrode material has a minimal effect on the room temperature life performance.

What is claimed is:

1. A lithium secondary battery comprising:
a positive electrode; and a negative electrode, wherein,
the positive electrode comprises from −30 parts by weight to 75 parts by weight of a first positive electrode active material having a $D_{50}$ of 9 μm or greater, based on 100 parts by weight of a total positive electrode active material, and further comprises a second positive electrode active material having a $D_{50}$ of 6 μm or less;
the negative electrode comprises a silicon-based active material;
a resistance ratio represented by Equation 1 below is within a range of from 100% to 140%: [SOC 5% discharge resistance]/[SOC 50% discharge resistance]× 100−100 (1), wherein the SOC 5% discharge resistance and the SOC 50% discharge resistance are resistances measured when a discharge pulse is applied at states of charge (SOC) of 5% and 50%, 2.5 C and 25° C. for 10 seconds, respectively; and a resistance ratio represented by Equation 2 below is within a range of from 90% to 110%: [SOC 5% discharge resistance]/[SOC 20% discharge resistance]× 100−100 (2), wherein the SOC 5% discharge resistance and the SOC 20% discharge resistance are resistances measured when a discharge pulse is applied at states of charge (SOC) of 5% and 20%, 2.5 C and 25° C. for 10 seconds, respectively.

2. The lithium secondary battery of claim 1, wherein the resistance ratio represented by Equation 1 is within a range of from 100% to 120%.

3. The lithium secondary battery of claim 1, wherein the positive electrode comprises from 40 parts by weight to 70 parts by weight of the first positive electrode active material having a $D_{50}$ of 9 μm or greater, based on 100 parts by weight of the total positive electrode active material.

4. The lithium secondary battery of claim 1, wherein the positive electrode comprises, as a positive electrode active material, a lithium composite oxide in which a nickel content is 60 mol % or more among 100 mol % of metals other than lithium and at least one selected from a group of cobalt, manganese and aluminum is comprised.

5. The lithium secondary battery of claim 4, wherein the nickel content is from 60 mol % to 80 mol %.

6. The lithium secondary battery of claim 4, wherein the nickel content is from 80 mol % to less than 100 mol %.

7. The lithium secondary battery of claim 4, wherein the nickel content is from 60 mol % to less than 100 mol %.

8. The lithium secondary battery of claim 1, wherein the negative electrode comprises the silicon-based active material and a carbon-based active material, as a negative electrode active material.

9. The lithium secondary battery of claim 8, wherein the carbon-based active material comprises at least one of artificial graphite or natural graphite.

10. The lithium secondary battery of claim 1, wherein the negative electrode comprises from 1 part by weight to 10 parts by weight of the silicon-based active material based on 100 parts by weight of a total amount of a negative electrode active material.

11. The lithium secondary battery of claim 1, wherein the silicon-based active material comprises at least one selected from a group of a silicon oxide, a silicon metal complex, and a silicon carbon composite.

12. The lithium secondary battery of claim 11, wherein the silicon-based active material comprises the silicon carbon composite, and in the silicon carbon composite, the silicon is nano silicon.

13. The lithium secondary battery of claim 1, wherein the resistance ratio represented by Equation 1 is within a range of from 100% to 115%.

14. The lithium secondary battery of claim 1, wherein the resistance ratio represented by Equation 2 is within a range of from 90% to 100%.

15. The lithium secondary battery of claim 1, wherein the resistance ratio represented by Equation 2 is within a range of from 90% to 98%.

16. The lithium secondary battery of claim 1, wherein the resistance ratio represented by Equation 2 is within a range of from 92% to 96%.

17. The lithium secondary battery of claim 1, wherein the first positive electrode active material is comprised in an amount of from 30 parts to 75 parts by weight and the second positive electrode active material is comprised in an amount of from 25 parts by weight to 70 parts by weight based on 100 parts by weight of the total positive electrode active material.

18. The lithium secondary battery of claim 1, wherein the first positive electrode active material is comprised in an amount of from 40 parts to 70 parts by weight and the second positive electrode active material is comprised in an amount of from 30 parts by weight to 60 parts by weight based on 100 parts by weight of the total positive electrode active material.

* * * * *